United States Patent [19]

Ishizuka

[11] 3,856,477

[45] Dec. 24, 1974

[54] PROCESS FOR REFINING ZIRCONIUM TETRACHLORIDE CONTAINING HAFNIUM TETRACHLORIDE

[76] Inventor: Hiroshi Ishizuka, 19-2 Ebara-6-chome, Tokyo, Japan

[22] Filed: Dec. 27, 1971

[21] Appl. No.: 212,170

[30] Foreign Application Priority Data
Dec. 28, 1970  Japan.............................. 45-119693
Nov. 20, 1971  Japan................................ 46-92751
Dec. 6, 1971  Japan................................ 46-97835

[52] U.S. Cl....................... 23/294, 423/492, 23/264
[51] Int. Cl............................. B01d 3/30, B01d 7/00
[58] Field of Search ............... 23/294, 264; 423/492

[56] References Cited
UNITED STATES PATENTS

| | | | |
|---|---|---|---|
| 1,641,503 | 9/1927 | Prichard .............................. | 23/294 |
| 2,214,838 | 9/1940 | McGavock........................... | 23/294 |
| 2,580,635 | 1/1952 | Winter................................. | 23/294 |
| 2,816,814 | 12/1957 | Pluckett.............................. | 23/294 |
| 2,944,878 | 7/1960 | Jaque.................................. | 23/294 |
| 3,079,993 | 3/1963 | Sweet.................................. | 23/294 |

FOREIGN PATENTS OR APPLICATIONS
2,000,976  7/1970  Germany ......................... 23/312 A Primary Examiner—Norman Yudkoff
Assistant Examiner—S. J. Emery
Attorney, Agent, or Firm—Waters, Roditi, Schwartz & Nissen

[57] ABSTRACT

A process for refining zirconium tetrachloride containing hafnium tetrachloride, by repeatedly evaporating and condensing zirconium tetrachloride containing hafnium tetrachloride between a pair of coaxially disposed cylinders. One of the pair of cylinders is kept at a temperature higher than the other. Vapor or powder of zirconium tetrachloride with a very low content of hafnium tetrachloride is produced at the lower end of cylinders, while delivering vapor or powder of zirconium tetrachloride with a high content of hafnium tetrachloride from the upper end of the cylinders. The vapor between the cylinders may be absorbed by an alkali metal chloride, alkaline earth metal chloride or a double salt thereof, which salt can form another double salt with zirconium tetrachloride and hafnium tetrachloride, so that said other double salt is repeatedly thermally refined in the space between the cylinders.

4 Claims, 3 Drawing Figures

PROCESS FOR REFINING ZIRCONIUM TETRACHLORIDE CONTAINING HAFNIUM TETRACHLORIDE

This invention relates to a process for refining zirconium tetrachloride containing hafnium tetrachloride, and more particularly to a process and apparatus for fractionally distilling zirconium tetrachloride containing hafnium tetrachloride, so as to separate hafnium tetrachloride therefrom for obtaining zirconium tetrachloride with a very low content of hafnium tetrachloride.

Metallic zirconium has a very large absorption cross section for thermal neutrons, for instance 0.18 barn, together with a very high corrosion resistance. Accordingly, metallic zirconium is an important material for nuclear reactors, for instance, as a nuclear fuel covering material. Metallic zirconium is produced by reduction of zirconium tetrachloride. Zirconium tetrachloride is generally made from zircon sand and thus crude zirconium tetrachloride usually contains up to several percent of hafnium chloride, because both zirconium and hafnium belong to the group IV, subgroup A of the periodic table and their chemical properties are very similar to each other. If such crude zirconium tetrachloride with a high content of hafnium tetrachloride is used to produce metallic zirconium, a comparatively high amount of hafnium is inevitably transferred into the metallic zirconium. When such metallic zirconium containing hafnium is used as a control member in nuclear reactors, e.g., as a control rod, hafnium acts to disturb the passage of thermal neutrons. To eliminate such disturbance, metallic zirconium for reactor applications is required to have a hafnium content of not greater than 0.01%. In order to produce metallic zirconium of such high purity, the aforesaid crude zirconium tetrachloride must be refined, so as to greatly reduce its hafnium content.

Since both zirconium and hafnium are sublimates and the difference of the sublimation temperatures thereof is very small, it has been believed to be difficult to use distillation for separating hafnium tetrachloride from zirconium tetrachloride to an extent sufficient for achieving the aforesaid high purity of the metallic zirconium. A conventional method of reducing the hafnium content of the crude zirconium tetrachloride is to make an aqueous solution of the crude zirconium tetrachloride so as to extract hafnium content by using a suitable organic solvent. Such conventional method, which is known as a wet process, is complicated and requires a large number of operating steps, resulting in a high cost.

Therefore, a principal object of the present invention is to obviate the aforesaid difficulties of the conventional complicated and costly wet process, by providing a novel dry process and apparatus for producing zirconium tetrachloride of high purity.

A specific object of the present invention is to provide a process and apparatus for refining zirconium tetrachloride containing hafnium tetrachloride by distillation, especially fractional distillation, which has heretofore been believed to be impossible. The zirconium tetrachloride refined by the process of the present invention can be used directly for economical production of high-purity metallic zirconium for reactor applications.

Other objects and advantages of the present invention may be appreciated by referring to the following description, taken in conjunction with the accompanying drawings, in which.

Figure 1:
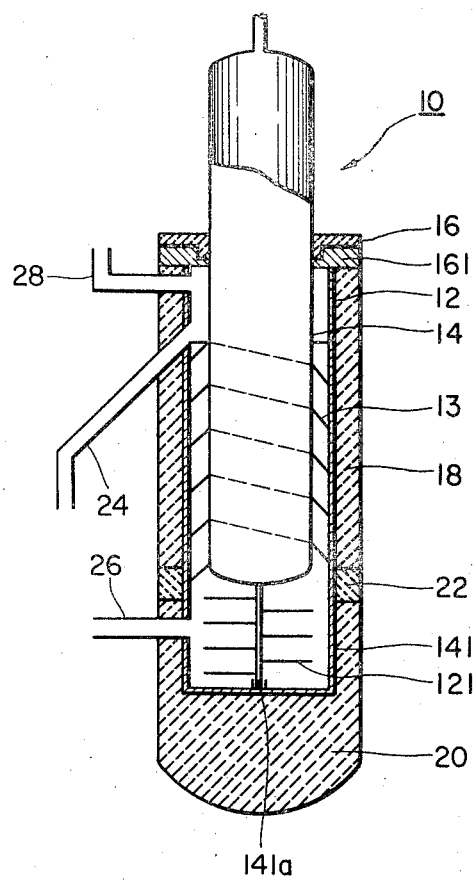
FIG. 1 is a schematic fragmental section of a first embodiment of an apparatus according to the present invention.

In FIG. 1, a first embodiment of the present invention is generally designated by reference number 10, which includes an outer cylinder 12 and an inner cylinder 14 coaxially disposed in the outer cylinder. An agitator 121 may be disposed in a receiver 141 defined at the lower portion of the outer cylinder 12. The agitator 121 is rotatably supported by the bottom plate of the receiver 141. The upper end of a space between the outer cylinder 12 and the inner cylinder 14 is covered by a lid 16 with a sealing member 161, so that the space between the cylinders 12 and 14 is sealingly separated from the outside. This space cooperates with a fin-like spiral plate, to be described hereinafter, so as to form a thermal distillation column. The inner cylinder 14 may be used either as a heating member or a cooling member, by feeding a suitable cooling medium or a heating medium therein. Preferably, DOWTHERM liquid (a heat carrier made by Dow Chemical Company, and consisting of a eutectic mixture of biphenyl and biphenyl ether) which can be used for both heating and cooling purposes. A member 18 surrounds the outer cylinder 12, which member 18 is a heater or a cooler, depending on whether the medium in the inner cylinder 14 acts as a cooling medium or a heating medium.

What is meant by the "heating" and "cooling" refers to the temperature difference between the inner surface of the outer cylinder wall and the outer surface of the inner cylinder wall. In fact, both the inner cylinder and the outer cylinder are heated, one to a temperature slightly higher than the sublimation temperature of zirconium tetrachloride and the other to a temperature slightly lower than the sublimation temperature of zirconium tetrachloride. A scraper or a fin member 13 is provided so as to act on the wall surface of the lower temperature cylinder. The space between the inner cylinder 14 and the outer cylinder 12 form the thermal distillation column together with the fin member 13, as pointed out already.

In the embodiment of FIG. 1, the scraper 13 consists of a fin-like spiral member fixed to the wall surface of the higher temperature cylinder so as to slidably engage the wall surface of the lower temperature cylinder. More particularly, when the inner cylinder 14 carries a cooling medium, the scraper 13 is secured to the inner surface of the outer cylinder 12. On the other hand, when the member 18 acts as a cooling member, the scraper 13 is secured to the outer wall surface of the inner cylinder 14. The function of the scraper 13 is to scrape zirconium tetrachloride from the surface of the lower temperature cylinder, as the zirconium tetrachloride condensates are deposited thereon, so as to gradually deliver the zirconium tetrachloride to the receiver 141.

The lower end of the outer cylinder, i.e., the receiver 141, is heated from the outside by a furnace 20 disposed at lower end of the apparatus 10. An annular heat-insulating member 22 may be disposed between the furnace 20 and the member 18, as shown in FIG.

1. Such heat-insulating member 22 is particularly effective when the member 18 is used for cooling purposes.

The apparatus 10 includes three pipes 24, 26, and 28, which are connected to the distillation column at different heights.

Figure 2:
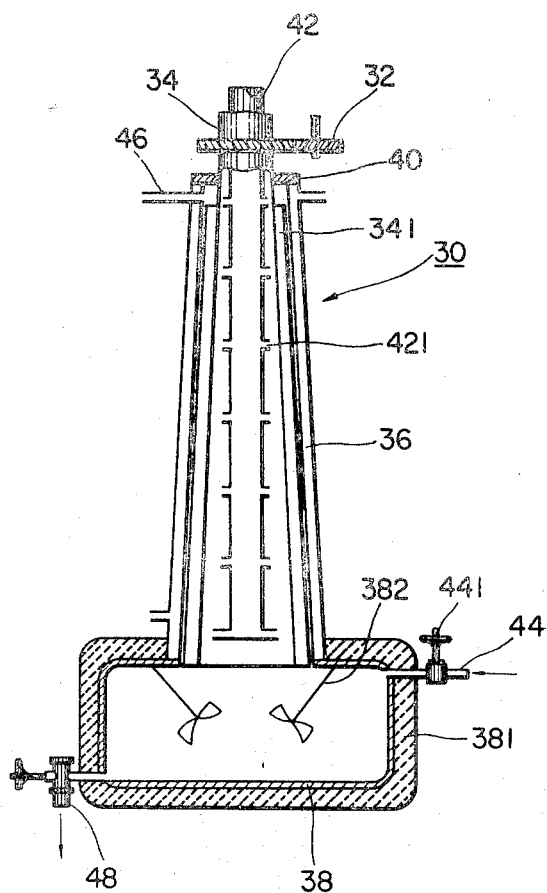
FIG. 2 is a view similar to FIG. 1, illustrating a second embodiment of the present invention.

FIG. 2 shows a second embodiment of the present invention, which is generally designated by reference numeral 30. The refining apparatus 30 includes an inner cylinder 34 having a rotating device 32, an outer cylinder 36 coaxially surrounding the inner cylinder, and a receiver 38 disposed in juxtaposition with the lower end of the outer cylinder 36 and having a heating means 381. The inner cylinder 34 and the outer cylinder are so tapered that their diameters gradually increase as the cylinders extend downwardly. Thus, the vertical cross section of the apparatus 30 is generally trapezoidal. Although the rotating device 32 is connected to the inner cylinder 34 in the illustrated embodiment, it is also possible to connect a similar rotating device to the outer cylinder 36 while removing the device 32 from the inner cylinder 34. A lid 40 sealingly covers the top end of a space between the inner cylinder 34 and the outer cylinder 36. The space between the inner cylinder 34 and the outer cylinder 36 communicates with the receiver 38, and this inner cylinder space and the receiver 38 are sealed from the outside by the lid 40.

The outer cylinder 36 consists of an inner side wall and an outer side wall spaced from the inner side wall, and the space between the two side walls is filled with a medium which can be used for either heating or cooling purposes. The medium may be continuously fed from the outside to the space, by a suitable means (not shown). preferably, the medium in the space between the two walls of the outer cylinder 36 is the aforesaid DOWTHERM liquid, because it can be selectively used for heating and cooling operations.

The inner cylinder 34 has a pipe 42 for receiving a suitable heating meadium such as hot air, so as to heat the inner cylinder from the inside thereof. Preferably, the pipe 42 extends along the central axis of the inner cylinder 34 and has a plurality of openings 421 for directing the heating medium to the wall of the cylinder in a uniform fashion.

With the apparatus 30 of FIG. 2, the space between the inner cylinder 34 and the outer cylinder 36 is used for evaporation and condensation of zirconium tetrachloride containing hafnium tetrachloride. To this end, there is provided a temperature differential across the two cylinders. The inner cylinder 34 is preferably kept at a temperature higher than the outer cylinder 36, from the standpoint of heat efficiency and the apparatus construction. However, it is also possible to use a higher temperature at the outer cylinder 36 than at the inner cylinder 34. A scraper 341 is provided for removing condensates deposited on the lower temperature cylinder. In the embodiment of FIG. 2, the scraper 341 is secured to the inner cylinder 34, so as to remove the condensates from the inner wall surface of the outer cylinder 36 which is the lower temperature cylinder in this case. The scraper may be a vertical or inclined fin member, or a spiral member, which is either a continuous member extending throughout the deposit receiving portion of the lower temperature cylinder or a discontinuous member capable of scraping the deposit in succession.

The taper angle of the inner cylinder 34 and the outer cylinder 36 is experimentally determined. Generally speaking, the fractional sublimation efficiency increases as the taper angle is made larger. As will be apparent to those skilled in the art, when the taper angle is excessively large, the travel of zirconium tetrachloride powder which condenses on the surface of the lower temperature cylinder, is disturbed by the surface of the higher temperature cylinder before the powder reaches the receiver, so as to deteriorate the overall efficiency of the refining process. Accordingly, the taper angle must be selected while considering the ratio of the cylinder heights and the cylinder diameters.

Three pipes 44, 46, and 48 are connected to the refining apparatus 30. The pipe 44 feeds the starting crude zirconium tetrachloride from a starting material tank (not shown) to the receiver 38. The pipe 44 opens at the upper end of the receiver 38. The pipe 46 is to remove the vapor of zirconium tetrachloride with a high centent of hafnium tetrachloride from the refining apparatus 30. The third pipe 48 is to deliver refined zirconium tetrachloride collected in the receiver 38.

Figure 3:
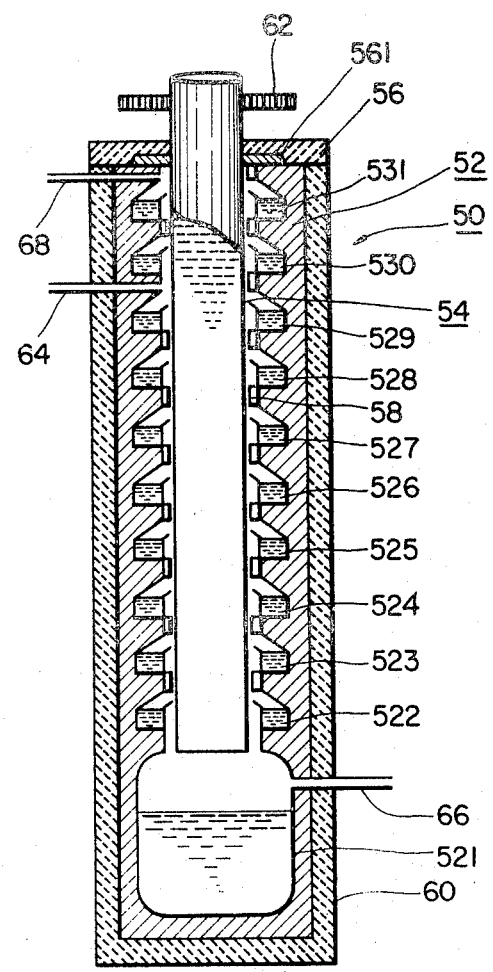
FIG. 3 is another view similar to FIG. 1, illustrating a third embodiment of the present invention.

Another refining apparatus 50, according to a third embodiment of the present invention, is shown in FIG. 3. The apparatus 50 includes an inner cylinder 54 and an outer cylinder 52 coaxially surrounding the inner cylinder and having a receiver 521 formed at the lower end thereof. The receiver 521 may also be formed separately from the outer cylinder 52. The space between the outer cylinder 52 and the inner cylinder 54 is sealingly closed by a sealing member 561 integrally formed with a lid 56, so that the space between the two cylinders and forming a thermal distillation column is sealingly isolated from the outside of the refining apparatus 50. Starting crude zirconium tetrachloride is refined in the space, as will be described later. The outer cylinder 52 includes a plurality of heating and evaporating portions 522 to 531, which hold molten salt or double salt of alkali metal chloride or alkaline earth metal chloride capable of forming a double salt with both zirconium tetrachloride and hafnium tetrachloride.

A scraper means 58 acts to remove the zirconium tetrachloride deposits, which condense on the inner wall surface of the outer cylinder 52, so as to deliver the deposits to the heating and evaporating portions 522 to 531 and to the receiver 521. The scraper means 58 is secured to the outer cylinder 52, because the outer cylinder 52 of FIG. 3 is used at a temperature higher than the inner cylinder 54.

The receiver 521 of the outer cylinder 52 and the heating and evaporating portions 522 to 531 thereof are heated from the outside by a heating furnace 60 to a temperature slightly higher than the sublimation temperature of zirconium tetrachloride. A suitable heating medium e.g., hot air or the aforesaid DOWTHERM liquid, is delivered to the inside of the inner cylinder 54, for keeping the outer surface of the inner cylinder 54 at a temperature slightly lower than the sublimation temperature of zirconium tetrachloride.

The inner cylinder 54 is rotated by a driving means 62, so that the zirconium tetrachloride deposits condensing on the outer surface therof can be removed by the scraper means 58.

The refining apparatus 50 also includes three pipes 64, 66, and 68 communicated with the thermal distillation column between the inner cylinder 54 and the outer cylinder 52. The pipe 64 feeds starting zirconium tetrachloride to be refined, the pipe 66 delivers the refined zirconium tetrachloride to the outside of the apparatus 50 (this pipe 66 may also be used for feeding the vapor of the starting zirconium tetrachloride to be refined to the apparatus 50), and the pipe 68 removes the vapor of zirconium tetrachloride containing hafnium tetrachloride.

The operation of the aforesaid refining apparatuses 10, 30 and 50 for refining the starting zirconium tetrachloride containing hafnium tetrachloride will now be described.

a. The first embodiment (apparatus 10)

A cooling liquid is fed into the inner cylinder 14, so as to cool the outer surface thereof. The member 18 is used as the heating member, so as to heat the outer cylinder 12 from the outside.

The vapor of starting or crude zirconium tetrachloride is generated by heating a starting material tank (not shown) and delivered to the refining apparatus 10 through the pipe 24. The vapor of the starting material enters the thermal distillation column between the cylinders 12 and 14, and condenses on the outer surface of inner cylinder 12, because this cylinder is cooled to a temperature slightly below the sublimation temperature of the starting material. The scraper 13 consisting of a fin-like spiral plate, which is secured to the outer cylinder 12, acts to scrape the condensates from the outer surface of the inner cylinder 14. The deposits fall on the spiral plate of the scraper and are then delivered to the receiver 141, as the scraper rotates. At least a part of the zirconium tetrachloride condensates thus removed from the outer surface of the inner cylinder 14 comes in contact with the outer cylinder and re-evaporates before reaching the receiver 141, because the outer cylinder is heated to a temperature slightly above the sublimation temperature of the zirconium tetrachloride. Similarly condensates coming in the close proximity of the outer cylinder 12 also re-evaporate. The vapor generated by such re-evaporation again condenses at the outer surface of the inner cylinder 14, and then repeat the aforesaid re-evaporation.

Thus, the amount of the zirconium tetrachloride condensate in the receiver 141 gradually increases. In order to achieve a high degree of refinement, the temperature of the heating furnace 20 is suitably controlled so as to continously evaporate a part of zirconium tetrachloride in the receiver 141. It is very important to uniformly heat the condensate of the zirconium tetrachloride in the receiver 141. To this end, the refining apparatus 10 of FIG. 1 includes the agitator 121, which is of rotary type. It is also possible to use an agitator of different type. For instance, balls made of a highly heat-conductive metal can be accomodated in the receiver 141, while constructing the receiver 141 so as to allow the balls to move therein, like a tower mill. With such balls, the uniformity of the heating effect can be achieved. According to the present invention, it is also possible to form a double salt of the zirconium tetrachloride thus generated in the receiver 141 with an alkali or alkaline earth metal chloride, such as sodium chloride, potassium chloride, and lithium chloride, or a double salt thereof. If such double salt is formed in the receiver 141, the uniformity of the heating is further improved.

The crude zirconium tetrachloride fed through the pipe 24 is thus refined by the repeated re-evaporation and condensation in the thermal distillation column, so that zirconium tetrachloride with a high content of hafnium tetrachloride is collected at the upper portion of the space in vapor or powder form, while refined zirconium tetrachloride with a greatly reduced content of hafnium tetrachloride is accumulated in the lower portion of the thermal distillation column in the vapor or powder form.

The ratio of the vapor pressures of zirconium tetrachloride and hafnium tetrachloride is 1:2.5 at 227°C under a pressure of 9 mmHg, 1:1.8 at 340°C under atmoshperic pressure, and 1:1.7 at 390°C under 5 atmospheric pressures. Accordingly, as long as the temperature is in a range of 200°C to 450°C, the refining can be effected at atmospheric pressure or above or below it.

The zirconium tetrachloride powder with a low content of hafnium tetrachloride, which is initially collected in the receiver 141 is further treated by the aforesaid repeated condensation and re-evaporation caused by the heating furnace 20 and the agitator 121. This further treatment can also be applied by feeding zirconium tetrachloride powder to the receiver 141 through the pipe 26 (the pipe 26 also to deliver the refined zirconium tetrachloride to the outside of the apparatus 10). The vapor of zirconium tetrachloride with an increased concentration of hafnium tetrachloride is removed from the upper portion of the thermal distillation column through the pipe 28. As a result, the concentration of hafnium tetrachloride in the form of powder, or the double salt, in the receiver 121 is gradually reduced.

When the hafnium tetrachloride concentration in the receiver 141 is proved to be below a certain predetermined level, for instance, not greater than 0.01%, the refined zirconium tetrachloride is delivered to a separate storage tank (not shown) through the pipe 26. As pointed out above, further refinement is possible by feeding the refined zirconium tetrachloride from the storage tank to the refining apparatus 10, if so desired.

b. Second embodiment (FIG. 2)

Referring to FIG. 2, the inner cylinder 34 and the outer cylinder 36 are preheated approximately to the desired temperatures, respectively. When the inner cylinder 34 is used as a comparatively higher temperature cylinder while using the outer cylinder 36 as a comparatively lower temperature cylinder, the heating medium is fed through the pipe 42, e.g., hot air, so as to raise the temperature of the outer wall of the cylinder 34 at a temperature slightly above the sublimation temperature of zirconium tetrachloride. At the same time, another heat carrying medium, e.g., the DOWTHERM liquid, is fed to the outer cylinder 36 to the space between its inner and outer walls, so as to keep its inner surface facing said outer surface of the inner cylinder to a temperature slightly below the sublimation temperature of the zirconium tetrachloride. The inner cylinder 34 is then rotated by the driving means 32. The starting zirconium tetrachloride to be refined is evaporated by heating a source tank (not shown), and the vapor thus generated is delivered to the refining apparatus 30 thus heated.

The vapor of the starting material is fed to the thermal distillation column between the cylinders 34 and 36, and it condenses on the inner surface of the outer cylinder 36 because the temperature there is slightly below the sublimation temperature of the starting material. The scraper 341 secured to the inner cylinder 34 acts to scrape and remove the zirconium tetrachloride condensate from the inner surface of the outer cylinder 36, as the condensates are formed thereon, in response to the rotation of the inner cylinder 34. The condensates thus scraped tend to fall through the thermal distillation column toward the receiver 38. At least a part of the condensates, however, comes in close proximity to or in direct contact with the outer surface of the inner cylinder 34 and re-evaporates due to the temperature thereof. Nevertheless, zirconium tetrachloride powder gradually accumulates in the receiver 38, in the same manner as in the preceding refining apparatus 10. When the amount of the zirconium tetrachloride in the receiver 38 increases to a predetermined level, a valve 441 is closed, and the heater or heating furnace 381 is actuated for heating the receiver 38. Thus, the powder of the zirconium tetrachloride in the receiver is again subjected to the aforesaid re-evaporation and re-condensation for further refinement. The aforesaid refining through the re-evaporation and re-condensation is repeated until the concentration of hafnium tetrachloride in the receiver 38 is reduced below a certain allowable level. An agitator means 382 is provided to ensure the uniform heating of the zirconium tetrachloride in the receiver 38. Although an impeller-type agitator is illustrated, any other suitable agitor can be used. For instance an agitator using, a number of heat-conductive metallic balls may be employed, as described in the foregoing by referring to FIG. 1.

Furthermore, an alkali or alkaline earth metal chloride or a mixture thereof, for instance, potassium chloride and/ or lithium chloride may be introduced into the receiver 38 during the refining process, for generating a double salt or salts with zirconium tetrachloride condensates. Such double salt or double salts are effective for improving the evenness or uniformity of the heating effect of the receiver 38.

After the desired purity is achieved by the aforesaid repetition of the evaporation and condensation, the vapor of zirconium tetrachloride with a high content of hafnium tetrachloride is removed from the refining apparatus 30 through the pipe 46, so that refined zirconium tetrachloride with a greatly reduced concentrations of hafnium tetrachloride remains in the refining apparatus 30.

Instead of feeding through the pipe 44, the starting zirconium tetrachloride with a high content of hafnium tetrachloride may be fed to the refining apparatus 30 through the pipe 46 for accumulating it in the receiver 38 before starting the rotation of the inner cylinder 34. The inner cylinder 34, of course, starts its rotation after a suitable amount of the starting material is collected in the receiver 38.

When the refined zirconium tetrachloride is collected in the receiver 38 in the powder form, it is removed from the apparatus 30 through the pipe 48 connected to the lower end of the receiver 38. On the other hand, if the refined product is in the vapor form, it is removed from the pipe 44 connected to the upper end of the receiver 38.

c. The third embodiment (FIG. 3)

Referring to FIG. 3, one or more of simple chloride or double salts of chlorides of alkali metals and alkaline earth metals are placed in the heating and evaporating portions 522 to 531, as well as in the receiver 521, before starting the rotation of the inner cylinder 54 by the driving means 62. Hot air or gas is delivered to the rotating inner cylinder 54, so as to heat its outer surface to a temperature slightly below the sublimation temperature of zirconium tetrachloride. At the same time the heating furnace 60 heats the outer cylinder 52, so as to raise the temperature of the heating and evaporating portions 522 to 531 and the receiver 521 to a level slightly above the sublimation temperature of zirconium tetrachloride.

Starting zirconium tetrachloride with a high content of hafnium tetrachloride is separately evaporated and delivered to the refining apparatus 50 in the vapor or through the pipe 64, after the apparatus 50 is preheated in the aforesaid manner. The vapor of the starting zirconium tetrachloride with a high content of hafnium tetrachloride, which is delivered to the thermal distillation column between the cylinders 52 and 54, condenses as it contacts the outer surface of the inner cylinder 54, because the latter surface is kept below the sublimation temperature of zirconium tetrachloride. The scraper means 58 secured to the inner surface of the outer cylinder 52 scrapes or removes the condensate formed on the outer surface of the inner cylinder 54. Most of the condensate thus scraped falls in the heating and evaporating portions 529, 530, and 531, so as to produce a double salt with the molten salt accomodated in such heating and evaporating portions. Since the portions 529 to 531 are kept at a temperature higher than the sublimation temperature of zirconium tetrachloride, the double salt thus formed decomposes to evaporate zirconium tetrachloride. The vapor of zirconium tetrachloride thus re-evaporated comes in contact with or in close vicinity of the relatively low temperature inner cylinder 54, so that it condensates again, so as to be scraped again by the scraper means 58. The scraped condensates mostly fall in the portion 528, 529, and 530. Thus, the repetition of the re-evaporation and re-condensation takes place in the similar manner to the preceding refining apparatuses 20 and 30, except using the formation and decomposition of the double salt. The zirconium tetrachloride gradually descends toward the receiver 521 through the thermal distillation column while being refined by the aforesaid repetition of formation and decomposition of the double salt. At the receiver 521, the refined zirconium tetrachloride again forms the double salt with the aforesaid compound preloaded therein.

As a result, a double salt containing zirconium tetrachloride with a greatly reduced content of hafnium tetrachloride is collected in the receiver 521. The vapor containing an increased amount of hafnium tetrachloride is removed from the upper end of the thermal distillation column through the pipe 68. When a predetermined amount of the refined zirconium tetrachloride in the form of the double salt is collected in the receiver 521, the delivery of the starting material through the pipe 64 is interrupted, so that the double salt in the receiver 521 is heated by the heating furnace 60 for repeating the aforesaid refining process including the decomposition and formation of the double salt, while removing the vapor of zirconium tetrachloride with a high concentration of hafnium tetrachloride from the upper end of the thermal distillation column through the pipe 68. Consequently, the concentration of hafnium tetrachloride in the double salt collected in the receiver 521 is gradually reduced to a desired level, e.g., to not greater than 0.01 %.

When the aforesaid desired low concentration of hafnium tetrachloride is achieved in the receiver 521 the pipe 68 is blocked and the pipe 66 is opened for delivering the vapor of the refined zirconium tetrachloride to a separate storage tank (not shown), where the zirconium tetrachloride is cooled and solidified. If necessary, the solidified zirconium tetrachloride can further be refined by repeating the aforesaid refining process in the apparatus 50.

The composition of the double salt in the heating and evaporating portions 522 to 531 and the receiver 521 depends on the temperature and pressure of the refining apparatus 50. For instance, the concentration of zirconium tetrachloride and hafnium tetrachloride in the double salt is selected to be 0% to 8%.

The invention will now be described in further detail by referring to examples.

EXAMPLE 1

A refining apparatus 10, as shown in FIG. 1, was made by using an inner cylinder made of a stainless steel cylinder with an inner diameter of 26 cm and a stainless steel outer cylinder with an inner diameter of 30 cm. The outer cylinder had a spiral scraper secured thereto, which scraper included 10 spirals at a pitch of 10 cm. The outer cylinder had a 50 cm deep receiver secured to the lower end thereof. The inner cylinder was rotated at one revolution per minute. Metallic balls with a 10 mm diameter were placed in the receiver and driven at 80 r.p.m.

The inner cylinder was heated to 300°C, while heating the outer cylinder to 400°C. Starting material consisting of zirconium tetrachloride containing 2% of hafnium tetrachloride was fed to the refining apparatus 10 through a pipe 24 at a rate of 150 grams/hour, while removing the exhaust vapor through the pipe 28 at 50 grams/hour. After running the apparatus 10 under such conditions for 50 hours, 5 Kg of zirconium tetrachloride was collected in the receiver 141. The hafnium concentration in the zirconium tetrachloride in the receiver 141 was 0.3%, while the hafnium concentration in the exhaust gas from the pipe 28 was about 5%.

The 5 Kg of zirconium tetrachloride in the receiver 141 was further refined for 40 hours by using the same apparatus 10, while exhausting the vapor through the pipe 28 at 50 grams/hour. The hafnium content in the refined zirconium tetrachloride in the receiver 141 was reduced to 0.005%, while the hafnium content in the exhaust gas from the pipe 28 varied from about 5% in the beginning to 0.1% at the end.

Thus, the overall separation factor of this refining apparatus 10 proved to be 20.

EXAMPLE 2

A refining apparatus 30, as shown in FIG. 2 was made by using the following parts.

| | | | |
|---|---|---|---|
| Inner cylinder: | | | |
| height | | | 5 mm |
| diameter, | | bottom | 80 cm |
| | | top | 45cm |
| rotation | | | 1 revolution per 5 minutes |
| scraper | | | vertical type |
| Outer cylinder: | | | |
| diameter, | | bottom | 90cm |
| | | top | 50cm |

-Continued

| | | |
|---|---|---|
| Receiver: | | |
| height | | 2m |
| diameter | | 126 cm |

The inner cylinder was heated to 350°C to 500°C, while heating the outer cylinder to 200°C to 300°C, and about 500 Kg of a double salt of lithium chloride and potassium chloride (at a mole ratio of 6:4) was placed in the receiver. The receiver was heated to 400°C for thoroughly melting the double salt. Vapor of starting zirconium tetrachloride material with 2% hafnium concentration was delivered to the refining apparatus 30 though the pipe 44 at 500 Kg/hr, while extracting an exhaust gas through the pipe 46 at 10 Kg/hr. After feeding about 3,000 Kg of the starting material through the pipe 44 in 6 hours, the feeding of the starting material is halted but the refining process was continued for the succeeding 144 hours. As a result, about 1,500 Kg of semi-refined zirconium tetrachloride was obtained in the receiver. Accordingly, about 1,500 Kg of vapor was exhausted through the pipe 46. The hafnium concentration of the semi-refined zirconium tetrachloride in the receiver 38 was about 0.1%, while the hafnium concentration of the exhaust gas from the pipe 46 varied from 20% to 1% with a mean value of about 4%.

The semi-refined zirconium tetrachloride was further refined, and 780Kg of refined zirconium vapor was separated from the double salt and collected through the pipe 44. The final zirconium tetrachloride proved to contain only 0.005% of hafnium. Thus, the overall separation factor was 10.

EXAMPLE 3

A refining apparatus 50, as shown in FIG. 3, was made by using a stainless steel inner cylinder with an inner diameter of 80cm, and a stainless steel outer cylinder having an inner diameter of 85 cm, an outer diameter of 126 cm, and 10 heating and evaporating portions at a spacing of 60 cm between adjacent such portions. The outer cylinder had a 150 cm high stainless steel receiver secured to the lower end thereof. Sodium chloride was placed in the heating and evaporating portions, as well as the receiver. The inner cylinder was rotated at 1 r.p.m. The inner cylinder was heated to 200°C to 300°C by hot air, while the outer cylinder was heated to 300°C to 500°C by an electric heater. Vapor of starting zirconium tetrachloride with 2% of hafnium tetrachloride was delivered to the refining apparatus 50 through the pipe 64 at 150 Kg/hr, while extracting exhaust gas through the pipe 68 at 50 Kg/hr. After 30 hours of operation, a double salt of zirconium tetrachloride (3,000Kg) and sodium chloride was collected in the receiver. The hafnium concentration in the zirconium tetrachloride in the receiver was 0.7%, and the mean hafnium concentration of the exhaust gas from the pipe 68 was about 4%.

Then the feeding of the starting material through the pipe 64 was halted, and zirconium tetrachloride in the double salt containing 3,000Kg of zirconium tetrachloride was further refined for 60 hours by the apparatus 50, while extracting the exhaust gas at 25 Kg/hr through the pipe 68. As a result, double salt of sodium chloride and 1,500Kg of zirconium tetrachloride with a hafnium concentration of 0.005% was obtained. The hafnium concentration in the exhaust gas varied from about 15% in the beginning to 0.1% at the end. The overall separation factor of the refining apparatus 50 proved to be 20.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A process for refining zirconium tetrachloride containing hafnium tetrachloride by collecting refined zirconium tetrachloride at the lower end of a thermal distillation column, while exhausting hafnium enriched zirconium tetrachloride from the upper end of the column, which process comprises the steps of maintaining one of two substantially vertical facing surfaces forming the distillation column at a uniform temperature higher than the sublimation temperature of zirconium tetrachloride while maintaining the other surface at a uniform temperature lower than the sublimation temperature; feeding vapor of crude zirconium tetrachloride to the distillation column in the space between the facing surfaces to condense zirconium tetrachloride at the lower temperature surface; scraping off the condensate from the lower temperature surface to cause at least a part of the condensate thus removed to contact the higher temperature surface for evaporation; causing a downward flow of the condensate while causing an upward flow of the vapor generated by said evaporation of said once deposited and scraped off condensate; repeating said condensation of the vapor due to contact with the lower temperature surface, scraping off the condensate and partial evaporation of the scraped condensate due to contact with the higher temperature surface; and causing sublimation of at least a part of the condensate collected at the lower end of the distillation column for further repeating said condensation and evaporation.

2. A process according to claim 1, further comprising the step of dissolving said condensate removed from the low temperature surface in a salt selected from the group consisting of chlorides of alkali metals, chlorides of alkaline earth metals, and double salts of chlorides of alkali metals and alkaline earth metals capable of forming a double salt with both zirconium and hafnium tetrachlorides.

3. A process according to claim 2, wherein said salt is selected from the group consisting of sodium chloride, potassium chloride, lithium chloride, and double salts of said chlorides.

4. A process for refining zirconium tetrachloride containing hafnium tetrachloride comprising the steps of blowing vapor of crude zirconium tetrachloride to a first substantially vertical surface kept at a temperature lower than the sublimation temperature of zirconium tetrachloride;

scraping off condensate of zirconium tetrachloride deposited on said first surface to cause the scraped condensate to dissolve in a molten salt capable of forming a double salt with both the zirconium tetrachloride and hafnium tetrachloride and selected from the group consisting of chlorides of alkali metals, chlorides of alkaline earth metals, and double salts of chlorides of alkali metals and alkaline earth metals;

thermally decomposing the resulting double salt by causing the double salt to contact a second surface kept at a temperature higher than the sublimation teperature of zirconium tetrachloride;

causing vapor generated by said thermal decomposition to contact said first surface for re-condensing the vapor;

rescraping the condensate from the first surface;

re-dissolving said re-scraped condensate in said molten salt;

transferring said zirconium tetrachloride downwards while repeating said recondensation, re-scraping, re-dissolving, and re-thermal decomposing, without transferring any part of said molten salt;

controlling the temperature of said first surface and said molten salt to regulate the amount of upwardly transferring vapor of zirconium tetrachloride and the amount of downwardly transferring zirconium tetrachloride solid condensate; and heating said downwardly moving solid condensate for causing re-sublimation of at least a part thereof.

* * * * *